United States Patent
Arrouye et al.

(10) Patent No.: US 7,996,380 B2
(45) Date of Patent: Aug. 9, 2011

(54) METHOD AND APPARATUS FOR PROCESSING METADATA

(75) Inventors: Yan Arrouye, Mountain View, CA (US); Kealin Lee Colclasure, Sunnyvale, CA (US); Dominic Benjamin Giampaolo, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 555 days.

(21) Appl. No.: 11/499,335

(22) Filed: Aug. 4, 2006

(65) Prior Publication Data
US 2008/0033921 A1 Feb. 7, 2008

(51) Int. Cl.
*G06F 17/30* (2006.01)
(52) U.S. Cl. ........ 707/707; 707/706; 707/731; 707/705; 709/201; 715/210
(58) Field of Classification Search .................. 707/705, 707/706, 707, 731; 709/201; 715/210
See application file for complete search history.

(56) References Cited

U.S. PATENT DOCUMENTS

| | | | | |
|---|---|---|---|---|
| 5,870,559 A * | 2/1999 | Leshem et al. | ................ | 709/224 |
| 6,678,700 B1 * | 1/2004 | Moore et al. | ................. | 707/200 |
| 6,799,180 B1 * | 9/2004 | McGrath et al. | ............. | 707/100 |
| 7,392,255 B1 * | 6/2008 | Sholtis et al. | ................. | 707/203 |
| 2004/0107169 A1 * | 6/2004 | Lowe | ............................. | 705/59 |
| 2005/0171734 A1 * | 8/2005 | Dropik | ......................... | 702/182 |
| 2006/0242126 A1 * | 10/2006 | Fitzhugh | .......................... | 707/3 |

* cited by examiner

*Primary Examiner* — Wilson Lee
*Assistant Examiner* — Tuan-Khanh Phan
(74) *Attorney, Agent, or Firm* — Blakely, Sokoloff, Taylor & Zafman LLP

(57) ABSTRACT

A method and apparatus for processing metadata search with plug-in applications is disclosed. In one embodiment, in response to a search request for metadata stored in a metadata store, a plug-in associated with the metadata store is invoked to perform the request search within the metadata store. In addition, according to another embodiment, a search result of the metadata search may be filtered based on user privileges of a client initiating the search request, and some or all of the metadata from the search result may be returned to the client dependent upon the user privileges of the client. Other methods and apparatuses are also described.

27 Claims, 16 Drawing Sheets

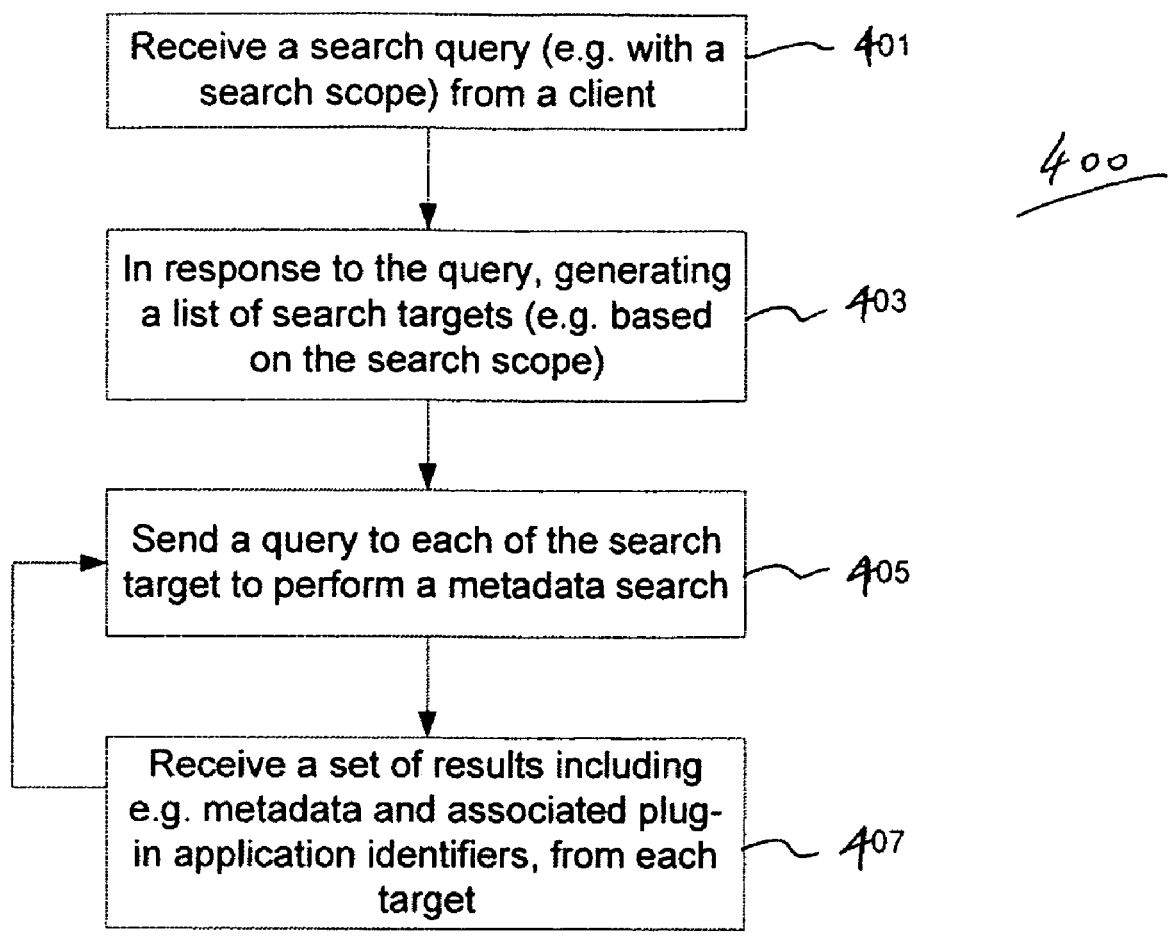
Fig. 4-A

| | 610 | 620 |
|---|---|---|
| | Where | /Users/max/Desktop |
| 601 { | Dimensions | 3072 x 2048 pixels |
| | Device make | Canon |
| | Device model | Canon EOS DIGITAL REBEL |
| 603 { | Color space | RGB |
| | Profile name | sRGB IEC61966-2.1 |
| | Focal length | 7S |
| | Alpha channel | no |
| | Red eye | no |
| | Exposure time | 0.0025 |
| | Keywords | Little League, baseball |
| 602 { | Last opened | Today 1:02 PM |
| | Size | 526.7 K |
| | Created | April 12, 2005 1:02 PM |
| | Modified | April 12, 2005 1:02 PM |

901 — R: resource

| Data | → Content Data  — 903 |
| Attr1 | → (Val1, Val2, Val3) — 905 |
| Attr2 | → (Val4)  — 907 |

User1:  Attr1: (Val1,Val3), Attr2: ()  — 909

User2:  Attr1: (Val1,Val2, Val3)  — 911

User3:  Attr1: (Val1,Val2, Val3), Attr2: (Val4), Attr3: (Val5, Val6)  — 913

| Attribute | User1 | User2 | User3 |
|---|---|---|---|
| Attr1 | x | x | x |
| Attr2 | x |  | x |

— 1001

| Attr1 Value | User1 | User2 | User3 |
|---|---|---|---|
| Val1 | x | x | x |
| Val2 |  | x | x |
| Val3 | x | x | x |

— 1003

| Attr2 Value | User1 | User2 | User3 |
|---|---|---|---|
| Val4 |  |  | x |

— 1005

METHOD AND APPARATUS FOR PROCESSING METADATA

FIELD OF THE INVENTION

The present invention relates generally to data processing. More particularly, this invention relates to processing metadata.

BACKGROUND

Modern data processing systems often include a file management system which allows a user to place files in various directories or subdirectories (e.g. folders) and allows a user to give the file a name. Further, these file management systems often allow a user to find a file by searching for the file's name, or the date of creation, or the date of modification, or the type of file. An example of such a file management system is the Finder program which operates on Macintosh computers from Apple Computer, Inc. of Cupertino, Calif. Another example of a file management system program is the Windows Explorer program which operates on the Windows operating system from Microsoft Corporation of Redmond, Wash. Both the Finder program and the Windows Explorer program include a find command which allows a user to search for files by various criteria including a file name or a date of creation or a date of modification or the type of file. However, this search capability searches through information which is the same for each file, regardless of the type of file. Thus, for example, the searchable data for a Microsoft Word file is the same as the searchable data for an Adobe PhotoShop file, and this data typically includes the file name, the type of file, the date of creation, the date of last modification, the size of the file and certain other parameters which may be maintained for the file by the file management system.

Many desktop search tools have emerged to enable a user to search for documents located on storage devices attached to a computer, either locally or remotely, such as Copernic Desktop Search, MSN Desktop Toolbar, Yahoo Desktop Search and Google Desktop. Typically, these tools create indexes out of information available in the file systems mounted to a computer operating environment, such as web browser histories, e-mail archives, word-processor documents and so on. A search is then conducted by matching query key words against the indexed data. Modern data processing system often includes a variety of file types. To index a new type of file, these desktop tools have to be upgraded with an additional file type support. This is not desirable as the number of new applications with new types of data continues to grow. Furthermore, an application may not allow direct access to an internal application data. Thus, support for a search for a metadata as part of an application data will not be available without interfacing with the application.

Usually, when a user selects a search result, an application is expected to act on the selection. For example, if the selected item is a hypertext with an URL (Universal Resource Identifier) points to a web page, a browser will be fetching and displaying the web page accordingly. If the selected item is a Microsoft Word document, a Microsoft Word application will be activated to process the document. Determining which application to activate for a selected item is typically done through an established association between an application and some information in the path identifying the selected item, such as the file name extension. It is well known that existing desktop search tools are capable of invoking Microsoft Word program for a selected item having a file name with a ".doc" extension. Utilities are also available in the operating environment allowing a user to associate an application with a designated file name extension. However, not every application has an established association with a file name extension. On the other hand, an application might not allow direct access to the underlying path information, such as a file name, of its application data. Therefore, the current mechanism of associating an application from a path identifying the application data may not apply for a metadata search result. As such, a user will not experience a unified user experience in conducting a search and using the search result.

Certain presently existing application programs allow a user to maintain data about a particular resource, such as a file. This data about a particular resource may be considered metadata because it is data about other data. A metadata for a particular file may include information about the author of a file, a summary of the document, and various other types of information. Typically, a metadata is an integral part of its associated resource and is maintained by the same application managing the associated resource. A program such as Microsoft Word may automatically create some of this data when a user creates a file and the user may add additional data or edit the data by selecting the "property sheet" from a menu selection in Microsoft Word. The property sheets in Microsoft Word allow a user to create metadata for a particular file or document.

However, in existing systems, a user is not able to search for metadata across a variety of different applications using one search request from the user. Even though existing desktop search tools could index the data of a file, none of them is capable of indexing the metadata associated with the file. Thus, existing systems can perform one search for data files, but this search does not also include searching through metadata for those files. Further, the metadata associated with a file is typically limited to those standardized metadata.

In addition, existing systems apply access permission to all metadata associated with a file or directory as a whole. For example, if a file is readable, all its associated metadata such as the modification date, creator codes, finger flags, icon position and label are all readable. Similarly, if a file is writable, all its associated metadata are writable.

SUMMARY OF THE DESCRIPTION

Methods and apparatuses for processing metadata are described herein. In one embodiment, in response to a search request for metadata stored in a metadata store, a plug-in associated with the metadata store is invoked to perform the request search within the metadata store. In addition, according to another embodiment, a search result of the metadata search may be filtered based on user privileges of a client initiating the search request, and some or all of the metadata from the search result may be returned to the client dependent upon the user privileges of the client.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 4A is a flow diagram illustrating a process for a metadata search according to one embodiment of the invention.

FIG. 6 is a diagram illustrating an example of metadata which may be used one embodiment.

DETAILED DESCRIPTION

Methods and apparatuses for processing metadata are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

An Example of a Metadata Processing System

Figure 1:
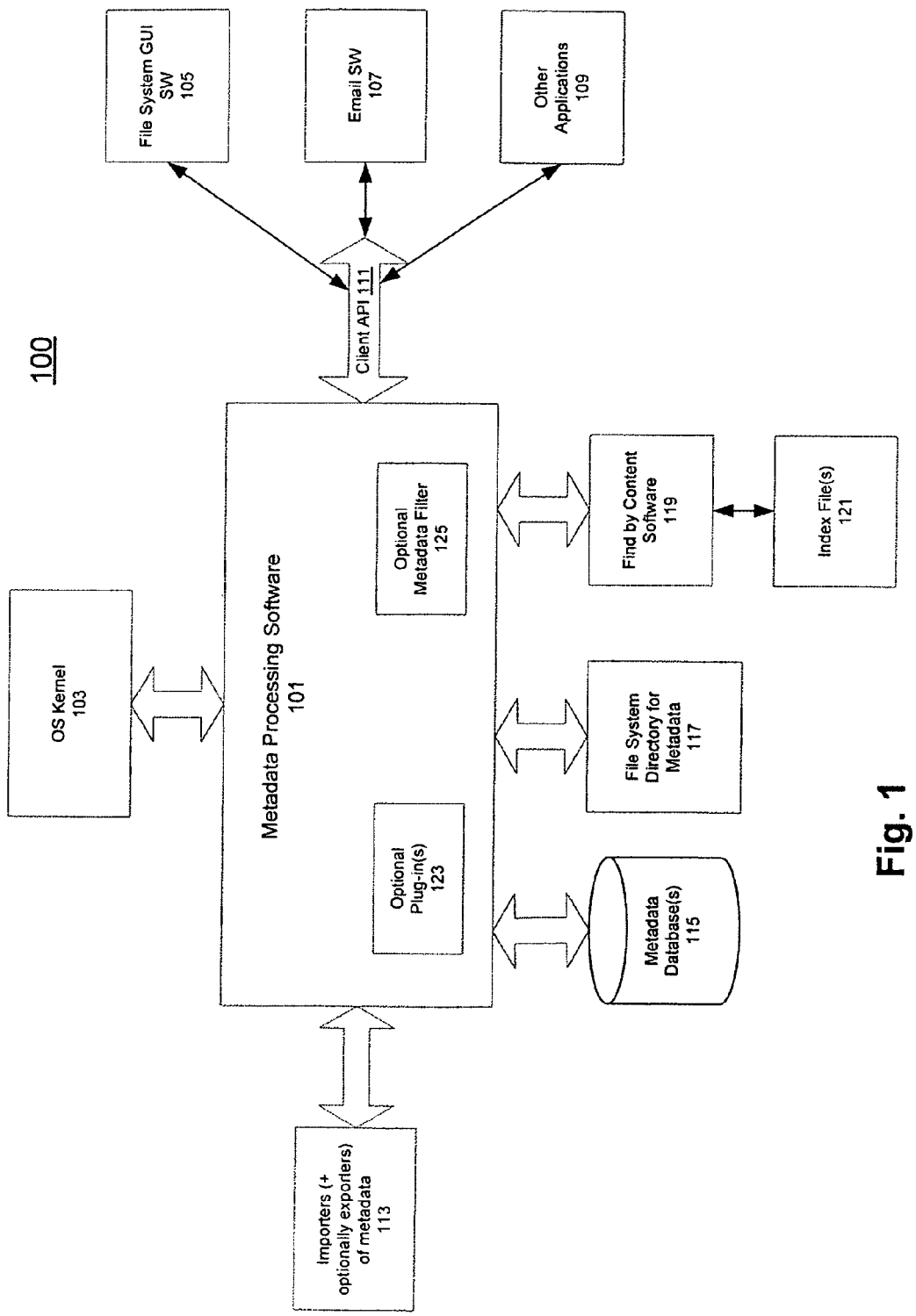
FIG. 1 is a block diagram illustrating an example of architecture for processing metadata which may be used with one embodiment of the invention.

FIG. 1 is a block diagram illustrating an example of architecture for processing metadata which may be used with one embodiment of the invention. Note that various different software architectures may be used to implement the functions and operations described herein. The following discussion provides one example of such an architecture, but it will be understood that alternative architectures may also be employed to achieve the same or similar results. The software architecture shown in FIG. 1 is an example which is based upon the Macintosh operating system.

Referring to FIG. 1, according to one embodiment, architecture 100 includes a metadata processing software 101 and an operating system (OS) kernel 103 which is operatively coupled to the metadata processing software 101 for a notification mechanism. The metadata processing software 101 is also coupled to other software programs such as a file system graphical user interface software 105 (which may be the Finder), an email software 107, and other applications 109. These applications are coupled to the metadata processing software 101 through client application program interface 111 which provide a method for transferring data and commands between the metadata processing software 101 and the software 105, 107, and 109. These commands and data may include search parameters specified by a user as well as commands to perform searches from the user, which parameters and commands (e.g., search terms or search scope) are passed to the metadata processing software 101 through the interface 111.

The metadata processing software 101 is also coupled to a collection of importers 113 which extract data from various applications. In particular, in one exemplary embodiment, a text importer is used to extract text and other information from word processing or text processing files created by word processing programs such as Microsoft Word, etc. This extracted information is the metadata for a particular file. Other types of importers extract metadata from other types of files, such as image files or music files. In this particular embodiment, a particular importer is selected based upon the type of file which has been created and modified by an application program.

For example, if the data file was created by PhotoShop, then an image importer for PhotoShop may be used to input the metadata from a PhotoShop data file into the metadata database 115 through the metadata processing software 101. On the other hand, if the data file is a word processing document, then an importer designed to extract metadata from a word processing document is called upon to extract the metadata from the word processing data file and place it into the metadata database 115 through the metadata processing software 101. Typically, different importers may be required in order to handle multiple different application programs which are used in a typical computer system. The importers 113 may optionally include multiple exporters which are capable of exporting the extracted metadata for particular types of data files back to property sheets or other data components maintained by certain application programs. For example, certain application programs may maintain some metadata for each data file created by the program, but this metadata is only a subset of the metadata extracted by an importer from this type of data file. In this instance, the exporter may export back additional metadata or may simply insert metadata into blank fields of metadata maintained by the application program.

The software architecture 100 also includes a file system directory 117 for the metadata. This file system directory keeps track of the relationship between the data files and their metadata and keeps track of the location of the metadata object (e.g. a metadata file which corresponds to the data file from which it was extracted) created by each importer. In one exemplary embodiment, the metadata database is maintained as a flat file format as described below, and the file system directory 117 maintains this flat file format. One advantage of a flat file format is that the data is laid out on a storage device as a string of data without references between fields from one metadata file (corresponding to a particular data file) to another metadata file (corresponding to another data file). This arrangement of data will often result in faster retrieval of information from the metadata database 115.

The software architecture 100 of FIG. 1 also includes find by content software 119 which is operatively coupled to a database 121 which includes an index of files. The index of files represents at least a subset of the data files in a storage device and may include all of the data files in a particular storage device (or several storage devices), such as the main hard drive of a computer system. The index of files may be a conventional indexed representation of the content of each document. The find by content software 119 searches for words in that content by searching through the database 121 to see if a particular word exists in any of the data files which have been indexed. The find by content software functionality is available through the metadata processing software 101 which provides the advantage to the user that the user can search concurrently both the index of files in the database 121 (for the content within a file) as well as the metadata for the various data files being searched.

In addition, according to certain embodiments of the invention, metadata processing software 101 may optionally include one or more metadata plug-ins 123 that provide an interface to a search facility in which the search may be conducted. A plug-in is a computer program that can, or must, interact with another program to provide a certain, usually very specific, function. Typical examples are plug-ins to display specific graphic formats (e.g., SVG if the program doesn't support this format natively), to play multimedia files, to encrypt/decrypt email (e.g., PGP), or to filter images in graphic programs. The main program (a web browser or an email client, for example) provides a way for plugins to register themselves with the program, and a protocol by which data is exchanged with plugins.

In this application, there may be a metadata store or database having a format or configuration that is not well known to system 100, or alternatively, system 100 does not implement a specific way to handle such metadata store or database. In this case, the metadata store or database may provide a plug-in having functionality (e.g., specific search capabilities) for the specific configuration of the metadata store or database.

In one embodiment, metadata processing software 101 may invoke the associated plug-in (e.g., also referred to as a plug-in interface) to perform a metadata search in the metadata store or database. As a result, the metadata processing software 101 does not need to know how to perform such a search within the respective metadata store or database. What it needs is to pass certain parameters of the search request to the plug-in and the invoked plug-in takes over the rest of the searches. This is typically useful for a third-party metadata store/database or search facility to be hooked up with the system 100.

In a further embodiment, a search result of metadata may be screened or filtered before returning to a client based on a privilege associated with the client or a user of the client, using a metadata filtering mechanism 125. For example, certain metadata of an object or file may not be appropriately exposed to certain users or clients, for example, based on certain access control lists (ACLs), which may be configured by an administrator of system 100. As a result, only a portion of the metadata that is determined to be viewable by the client would be returned, while the rest of the metadata may not returned in view of the usage privileges.

Examples of Metadata Searches Using a Plug-in

Figure 2A:
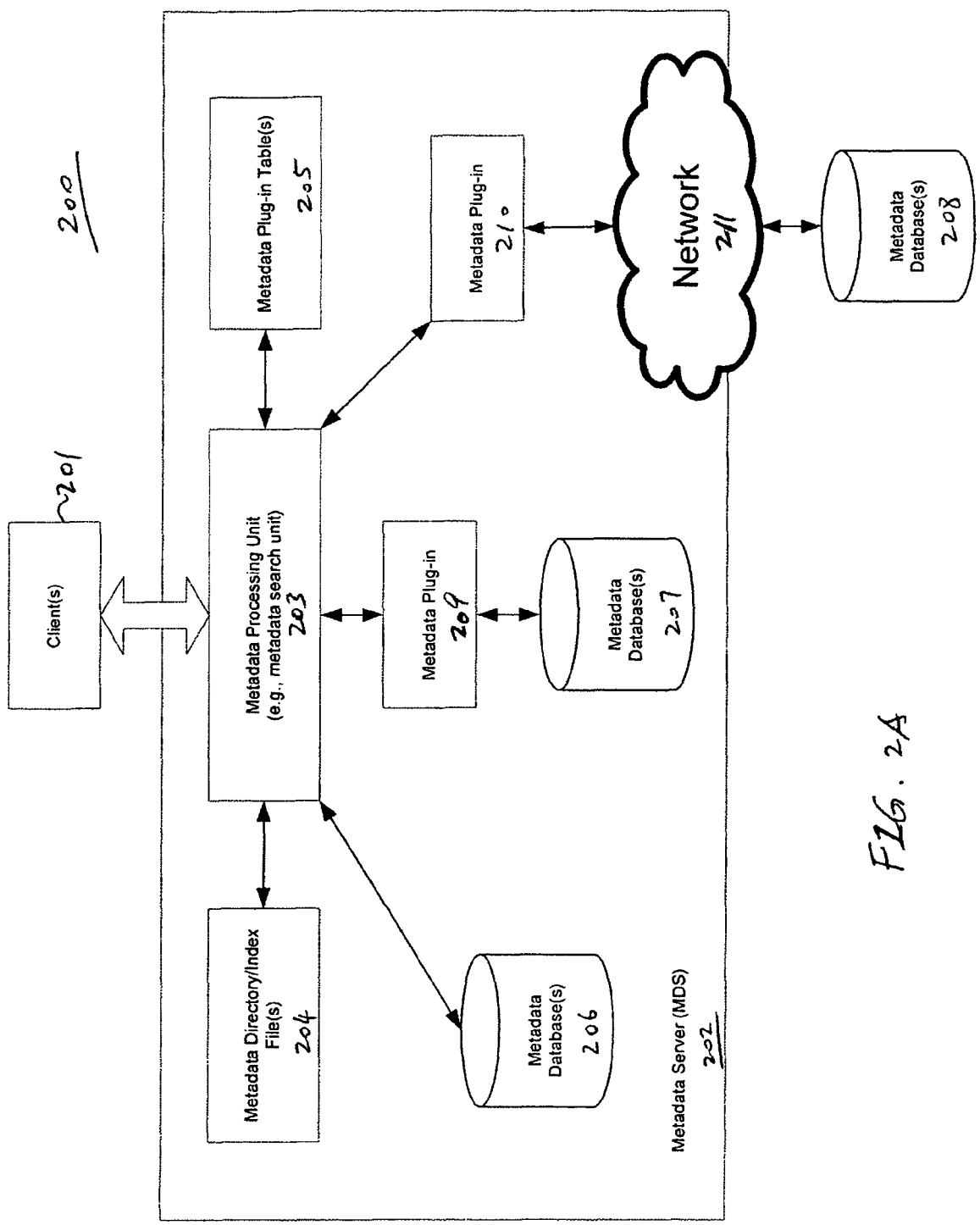
FIG. 2A is a block diagram illustrating a metadata processing system according to one embodiment of the invention.

FIG. 2A is a block diagram illustrating a metadata processing system according to one embodiment of the invention. For example, system 200 of FIG. 2 may be implemented as part of system 100 of FIG. 1. Referring to FIG. 2A, system 200 includes one or more clients 201 communicatively coupled to metadata server (MDS) 202. Clients 201 and MDS 202 may be located within a local system. Alternatively, clients 201 and MDS 202 may be communicatively coupled over a network. MDS 202 includes a metadata processing unit 203, in response to a metadata search request to access databases 206-208, locally or remotely. MDS 202 further includes one or more metadata directory/index files 204, which may be implemented as part of file system directory for metadata 117 and/or index files 121 of FIG. 1. MDS 202 further includes a metadata plug-in table 205 listing all of the plug-ins that have registered with the MDS 202. For example, plug-in 209 may be used by the metadata processing unit to access database 207 which may or may not well-known to the metadata processing unit 203. Similarly, plug-in 210 may be used to access database 208 over a network, which may be LAN (local area network) or WAN (wide area network). For the purposes of illustration, only databases 206-208 are shown. It will be appreciated that more or fewer databases may also be implemented.

For example, when a search request is received by the metadata processing unit 203 from client 201, metadata processing unit 203 may determine which of the databases 206-208 should be searched, for example, based on the information stored in metadata directory and/or index files 204. If the processing unit 203 determines that databases 207 and/or 208 need to be searched, the respective plug-ins 209 and/or 210 may be invoked based on information stored in the metadata plug-in table 205. In order to be invoked, according to one embodiment, a plug-in has to register with the MDS 202 and an executable of a plug-in may be stored within MDS 202 and a reference pointer or handle may be stored in the table 205. The executable of a plug-in may be activated at a startup time of MDS 202 or may be dynamically launched at runtime. In addition, a search query to any of the metadata databases 206-208 may be partitioned into multiple sub-queries, where each sub-query may be scheduled and/or searched independently (e.g., multi-threading). Further, a remote metadata store (e.g., database 208) may be mounted as a network drive using a network file access protocol, where metadata accesses to the mounted remote metadata store may be performed using a dedicated communication channel or tunnel established over the respective network file access protocol. Detailed information regarding the above features may be found in a co-pending U.S. patent application Ser. No. 11/499,267, entitled "Method and Apparatus for Searching Metadata", filed Aug. 4, 2006, which is incorporated by reference herein in its entirety. Other configurations may exist.

Figure 2B:
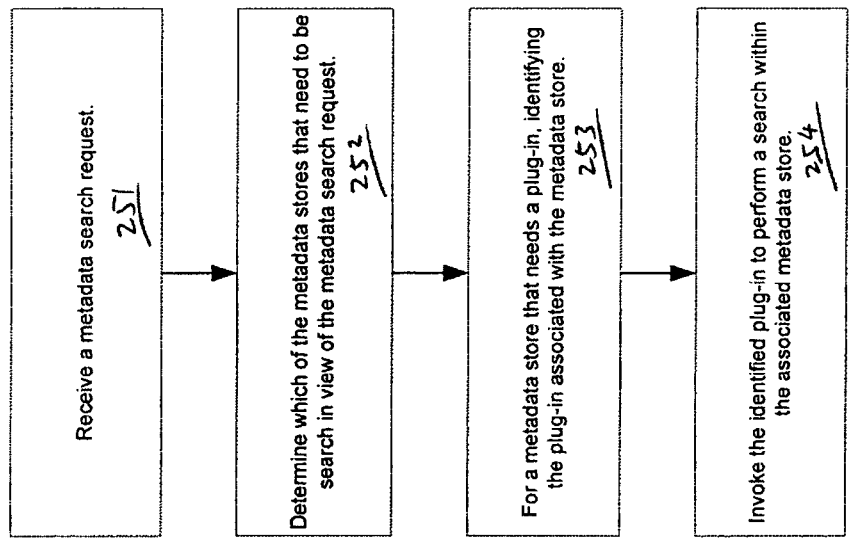
FIG. 2B is a flow diagram illustrating a process for processing metadata using a plug-in according to one embodiment of the invention.

FIG. 2B is a flow diagram illustrating a process for processing metadata using a plug-in according to one embodiment of the invention. Process 200 may be performed by a processing logic which may include software, hardware, or both. For example, process 200 may be performed by system 200 of FIG. 2A. Referring to FIG. 2B, at block 251, a search request for metadata is received from a client. The search request may include a search scope (also referred to as a meta-scope) and one or more search terms. At block 252, processing logic determines which of the metadata stores should be searched based on the search request. At block 253, if a metadata store needed to be searched requires a plug-in, processing logic identifies such a plug-in, and at block 254, processing logic invokes the identified plug-in to perform the search for the requested metadata.

Figure 3:
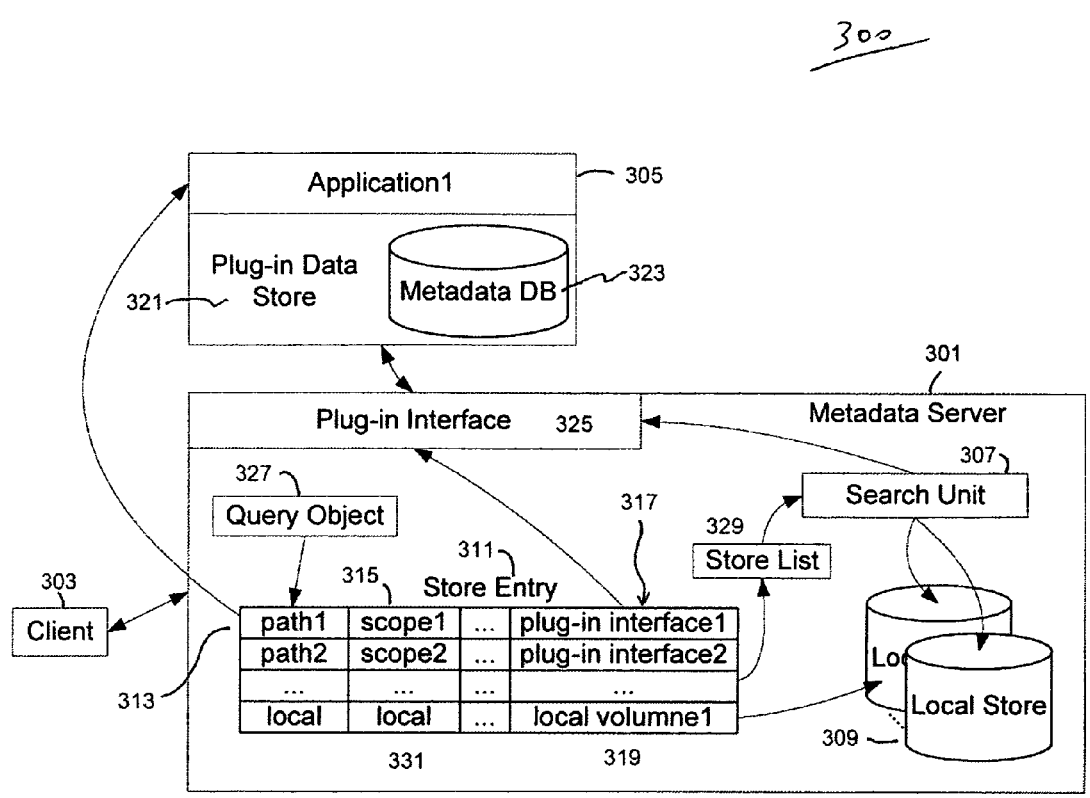
FIG. 3 is a block diagram illustrating an example of metadata processing system according to an alternative embodiment of the invention.

FIG. 3 is a block diagram illustrating an example of metadata processing system according to an alternative embodiment of the invention. For example, system 300 may be implemented as an alternative design of system 200 of FIG. 2A. Referring to FIG. 3, system 300 includes a metadata server 301 interfacing with a client 303 and a plug-in application 305 (e.g., third party application or third party search facility), which may be located locally or remotely over a network (e.g., LAN, WAN, or Internet). The client 303 may be a client process, for example, controlled by a user. In one embodiment, metadata server 301 further includes a search unit 307, one or more local stores 309, and a store entry 311. Some of the stores 309 may also be located remotely, physically (e.g., over a network) or logically (e.g., configured as a distant store). The search unit 307 is responsible for performing searches for metadata in the stores and issues search request to plug-in applications as needed.

A local store 309 includes metadata searchable by the search unit 307. An example of a local store is a file system in a mounted disk volume to the metadata server 301. However, a mounted disk may be a remote disk mounted over a network using a protocol similar to a network file system protocol, such that the corresponding store appears as if it is located locally. A store entry 311 includes a table of entries (e.g., a specific data structure or a lookup table), each having information about a search target (e.g., a storage to be searched). A search target may be a local store 309 or a plug-in application 305 with a plug-in data store 323, which may or may not be located remotely. An entry for a plug-in application may include an identification (e.g., a path to access) of the application (e.g. "path1" 313), the associated service scope (e.g. "scope1" 315), and information about a plug-in interface (e.g. "plug-in interface1" 317). In one embodiment, "path1" may be a URL (universal resource locator) linking with the store 323.

In one embodiment, the value of "scope1" 315 may indicate a plug-in application will be participating in a local metadata search only. In one embodiment, the value of "plug-in interface1" points to the location of a dynamic link library implementing a plug-in interface associated with the plug-in application "Application1" 305. An entry for a local store may include a local service scope 331 and information about the target local store 319. Note that in another embodiment, a metadata repository may be embedded inside a plug-in application remotely connected to the metadata server. The search unit may interface with the embedded metadata repository through a plug-in interface associated with the plug-in application. Alternatively, application 305 may be part of a search engine that is capable of searching within database 323, which may be located remotely with respect to application 305. Other configurations may exist.

A plug-in application 305 may include a plug-in data store 321 with an internal metadata database 323. Access to the metadata database 323 is completely inside the plug-in application 305. The plug-in application 305 exposes the plug-in data store 321 to the metadata server 301 through a plug-in interface 325 running inside the metadata server 301. Through the use of plug-in interfaces, different plug-in applications may provide unified search interfaces with the search unit 307 while maintaining their own individualized transactions with their corresponding plug-in interfaces. The capability of metadata server can thereby be extended with plug-in applications.

A plug-in application may include a plug-in data store which "shadows" an existing search scope, and selectively delegates searches to the shadowed data stores or to other arbitrary data stores internal to MDS as required. This shadowing capability may be used to extend MDS's internal data stores with capabilities such as fine-grained access control, etc.

FIG. 3 also shows a query object 327 created in responding to a search request received from the client 303, according to a specific embodiment. In one embodiment, the query object 327 includes search scope information extracted from the received search request. The query object 327 is then forwarded to the store entry 311 to determine a set of search targets. In one embodiment, the determination is performed based on matching the search scope inside the query object 327 with the service scope in an entry of the store entry 311. A search target may be a local store or a plug-in store. A search target corresponding to an entry with the service scope matching the search scope is thereby selected. Information about the set of selected stores is sent to the search unit 307 as a store list 329. Thereafter, the search unit 307 either performs a search over local stores 309 or calling a corresponding plug-in interface to search a plug-in application for each search target in the list of the store entry 311.

FIG. 4A is a flow diagram illustrating a process for a metadata search according to one embodiment of the invention. Process 400 may be performed by a processing logic which may include software, hardware, or both. For example, process 400 may be performed by system 300 of FIG. 3. In this example, metadata search results with associated application identifiers are returned to the client making the metadata search request. Referring to FIG. 4A, at block 401, a search query is received from a client process. Usually, the client process is controlled by a user who has already logged in to a system, such as a desktop computer, with associated user privileges. The search query can include a search scope specified by the user or automatically set by default.

In response to the received search query, a list of search targets is identified based on the query (block 403). In one embodiment, the search targets include one or more third party plug-in applications. Each plug-in application may be associated with a service scope indicating a condition when the plug-in application should participate in the search. In one embodiment, the condition can be determined by comparing the service scope of the plug-in application with the search scope embedded within the search request. A service scope, for example, might indicate a plug-in application is needed in serving a local search request, a remote search request or both. A search scope may limit the scope of search to be local only, remote only, or both. For example, if the service scope of a plug-in application indicates a local search and the search scope of a request specifies both local and remote, the plug-in application will be included as one of the search targets for receiving the search request. Other search targets, such as build-in metadata search applications, may also participate in the search.

At block 405, the search query is sent to each of the search targets. In one embodiment, a plug-in application receives the search request through an associated plug-in interface. The plug-in interface may be implemented, for example, as an executable or a dynamic link library. Such an executable may be launched when the system starts up. Alternatively, the executable may be launched dynamically when needed (e.g., per on-demand basis). A plug-in interface is usually provided by a third party together with a plug-in application or search facility. Communications between a plug-in interface and a plug-in application may be local or remote across a network (e.g., using tunneling protocols). Each search target, including a plug-in application, responds to the search request by conducting a metadata search.

Search results from each search target are received at block 407. A search result from a plug-in application may include an identifier of the plug-in application, an identifier of the resource associated with the metadata retrieved by the plug-in application, and other relevant information, such as attributes and/or values of metadata. In one embodiment, a plug-in application may be identified by a URL (universal resource locator). In one embodiment, the resource in the search result may be identified by a path.

Figure 4B:
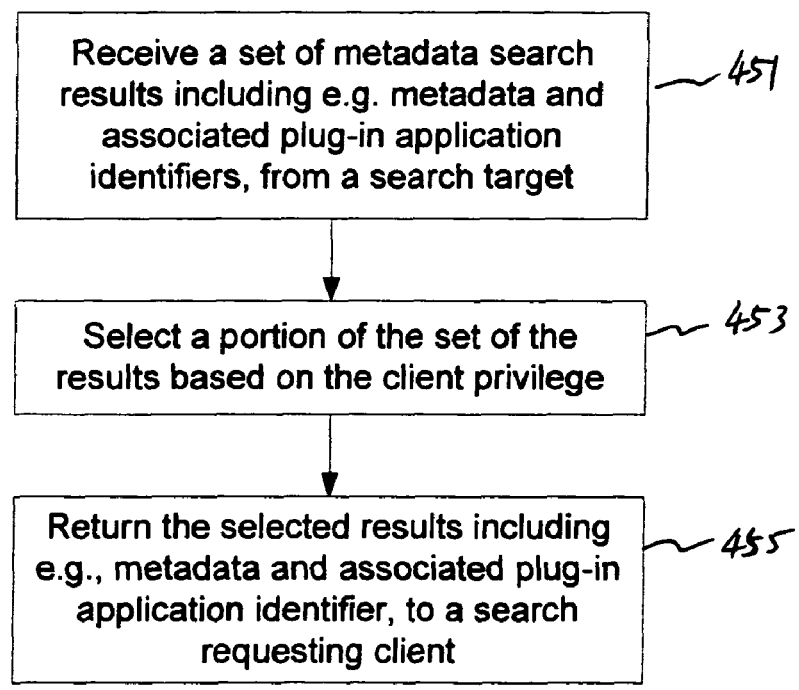
FIG. 4B is a flow diagram illustrating a process for filtering results of a metadata search according to one embodiment of the invention.

FIG. 4B is a flow diagram illustrating a process for filtering results of a metadata search according to one embodiment of the invention. Process 450 may be performed by a processing logic which may include software, hardware, or both. In this particular embodiment, metadata search results are received from a list of search targets, including third party plug-in applications (block 451). Before returning the search results, a selection is performed at block 453 to allow the client to access those search results consistent with a user privilege associated with the client. In one embodiment, the search request may include the user information. The associated user privilege is then obtained based on the user information. In one embodiment, a search result may provide the access control information corresponding to the retrieved metadata. In another embodiment, the access control information is obtained from a system service (e.g., user account information) based on the search result. In one embodiment, the system service may use an access control list (ACL) in the file system to drive the access control information. In another embodiment, the system service may retrieve the access control information from a plug-in application through an associated plug-in interface.

For each search result, the selection may allow the whole result, a partial result, or none of the result to return to the client. For example, a search result may include a photo image, the name of the photographer taking the photo, and the date the photo was taken. The selection might allow the user to access the name of the photographer and the date the photo was taken, but hide the actual photo image from the user. Further information regarding these features will be described in details further below.

After all selected search results from each search target are collected, they are returned to the client (block 455). These results might be presented to a user through the client process. In one embodiment, when a user clicks on a search result presented, the associated plug-in application may be automatically activated with identifiers of the resource and/or metadata from the corresponding search result. For example, a plug-in application such as Apperature from Apple Computer Inc., Cupertino, Calif. might return a search result identifying a JPEG photo image. A user clicking on the JPEG photo image would activate Apperature application automatically showing the photo image, even though a JPEG image might be associated with another image processing application by default set up by the user in the operating environment. Note that the relationship between an object (e.g., a JPEG image) and its plug-in interface may be transparent to a user. That is, a user may not know whether a plug-in interface has been invoked during a metadata search. Rather, a metadata search engine is intelligent enough to determine whether a plug-in interface is needed in order to access a particular search facility or storage.

Figure 5A:
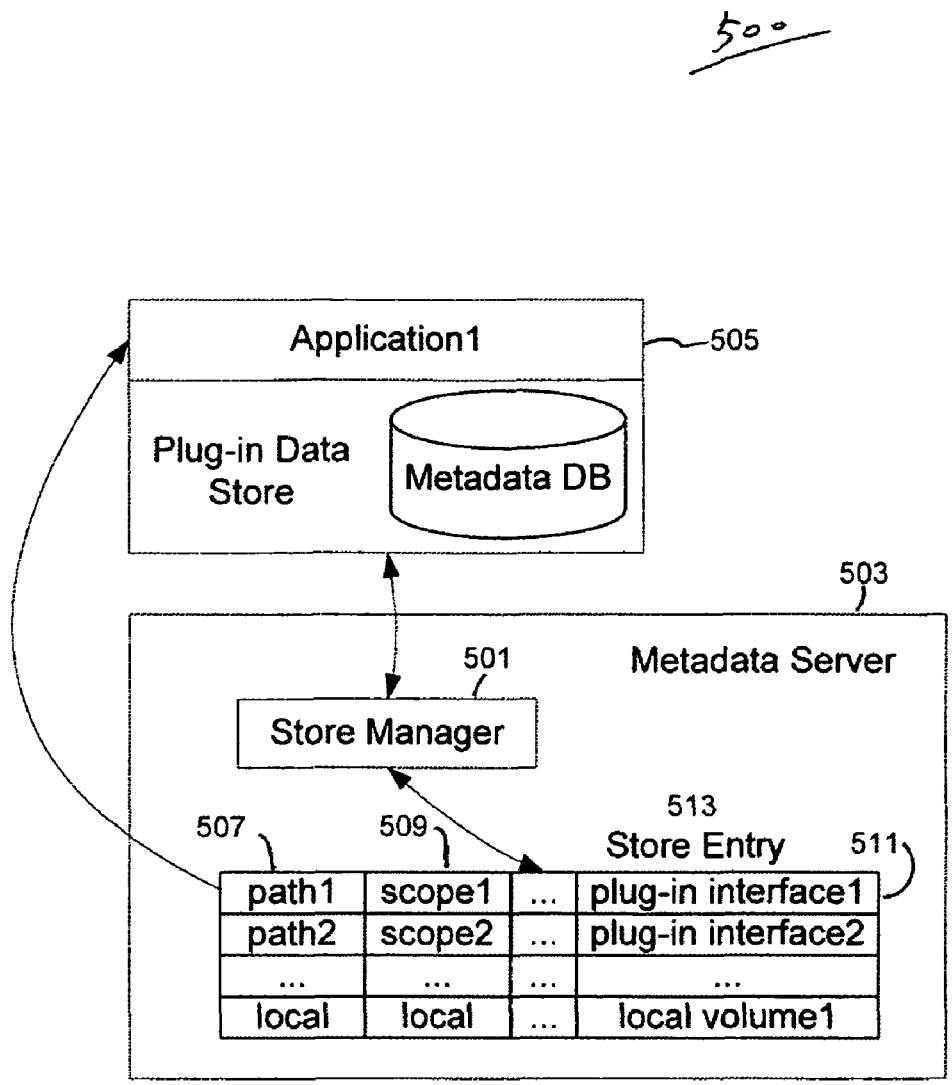
FIG. 5A is a block diagram illustrating registering a plug-in application with a metadata server according to one embodiment.

As described above, before a plug-in interface can be invoked, the plug-in interface has to register with the metadata search system. FIG. 5A is a block diagram illustrating registering a plug-in application with a metadata server according to one embodiment. System 500 may be implemented as part of system 300 of FIG. 3. In this example, a plug-in application 505 having a plug-in data store performs registration transactions with the store manager 501 of the metadata server 503. In one embodiment, the plug-in application 505 may reside in a separate server remotely coupled to the metadata server 503. In one embodiment, the plug-in application 505 may be running locally within the metadata server. During a registration transaction, the store manager 501 receives the metadata search properties from the plug-in application 505. The received properties may include, for example, information about, search scopes or meta-scopes 509, an application identifier 507, and a plug-in interface identifier 511, etc., which may be stored within store entry 513. Other information may also be included. In one embodiment, information about a received property may be verified and/or attached to the metadata server 503. For example, a plug-in interface may point to a dynamically linked library remotely located. The store manager 501 or other components (e.g. a search unit, etc.) may verify the validity of the remote library and further download the library and attach it locally before making an entry to the store entry 513. Once entries of the plug-in application 505 are successfully made into the store entry 513, for example, by the store manager 501, the plug-in application registration completes. Subsequently, a plug-in interface may be invoked via store entry 513 using the techniques set forth above.

Figure 5B:
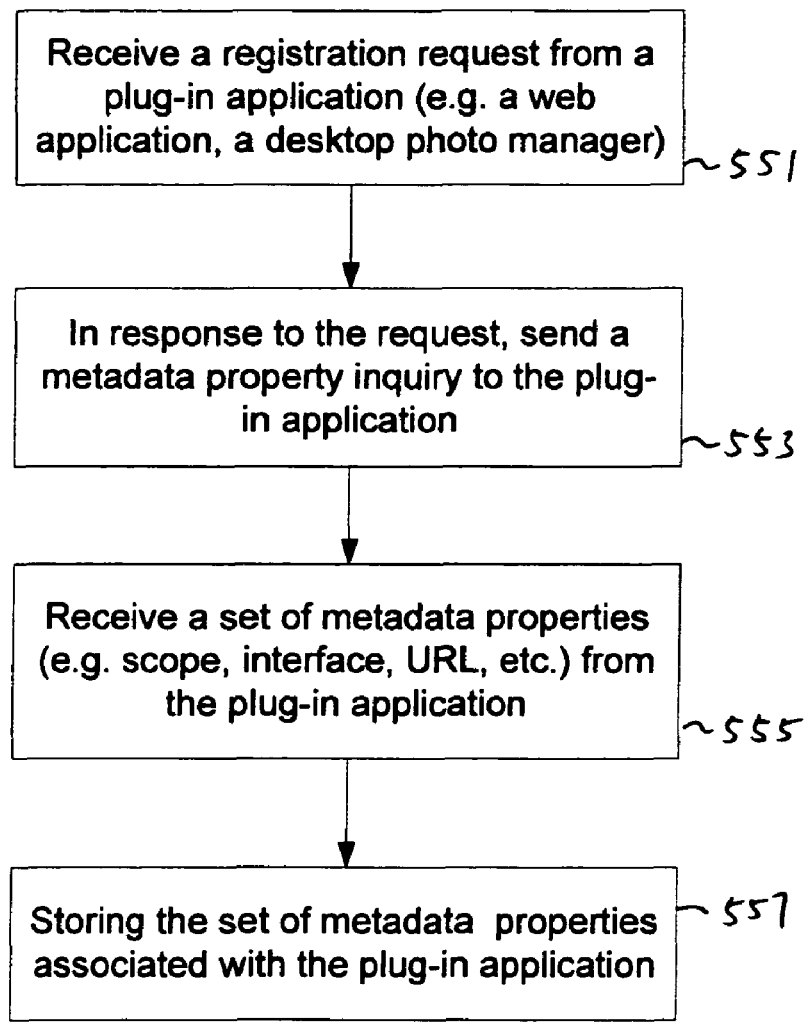
FIG. 5B is a flow diagram illustrating a process for registering a plug-in application to a metadata server according to one embodiment.

FIG. 5B is a flow diagram illustrating a process for registering a plug-in application to a metadata server according to one embodiment. Process 550 may be performed by a processing logic which may include software, hardware, or both. For example, process 550 may be performed by system 500 of FIG. 5A. In this example, a plug-in application may be any third party application interested in providing metadata search capabilities such as a web application running in a remote web server or a desktop photo management tool, etc.

Referring to FIG. 5B, at block 551, a registration request is received from a plug-in application. In response to the registration request received, a metadata property inquiry is sent to the plug-in application (block 553). In one embodiment, the property inquiry may request information regarding, for example, service scopes, an application identifier, and/or a plug-in interface identifier, etc. The service scopes may indicate the plug-in application would be participating in a local metadata search, a remote metadata search, or any metadata search with search scopes including the name of one of the service scopes. An application identifier may be an identifier for the plug-in application for the client process to activate the plug-in application. The plug-in interface identifier may be a pointer to a set of executable codes implementing a plug-in interface between the plug-in application and the metadata server. In one embodiment, the plug-in interface identifier points to a dynamic link library. Subsequent to sending the inquiry, a set of metadata properties associated with the plug-in application are received (block 555). The registration process is completed after storing the metadata properties within the metadata server (block 557). Other operations may also be performed.

Embodiments of Presenting Metadata Based on Client Privileges

As discussed above, certain attributes of metadata may or may not be available to a particular user dependent upon a user privilege of the user. For example, as shown in FIG. 6, metadata 600 is extracted from an image or digital photo file such as, for example, a JPEG or GIF file. Referring to FIG. 6, metadata 600 includes one or more attributes 610, each having a value 620, which may include a numeric, an alphabet or any characters, or a combination of these. For the purposes of illustration, an ordinary user or viewer of metadata 600 may only be interested viewing attributes 601 and 602. Such an ordinary user or viewer might not be interested view attribute 603. However, a photographer may be interested viewing attribute 603 for the technical setting of the image. In addition, an author of the image associated with the metadata 600 may just want a viewer to view attributes 601 and 602 without viewing attribute 603 because the author may not want anybody know how to take this image. Further, the author may just want certain users (e.g., friends) to view attribute 603.

According to certain embodiments of the invention, attributes 601-603 may be configured to be accessed based on user privileges of the clients or users. Certain metadata can be configured to be exposed to certain clients or users, while other metadata may be configured to hide from certain users or clients. Such configurations may be achieved using a metadata access control mechanism, similar to an access control list (ACL) of a file system, etc.

Figure 7A:
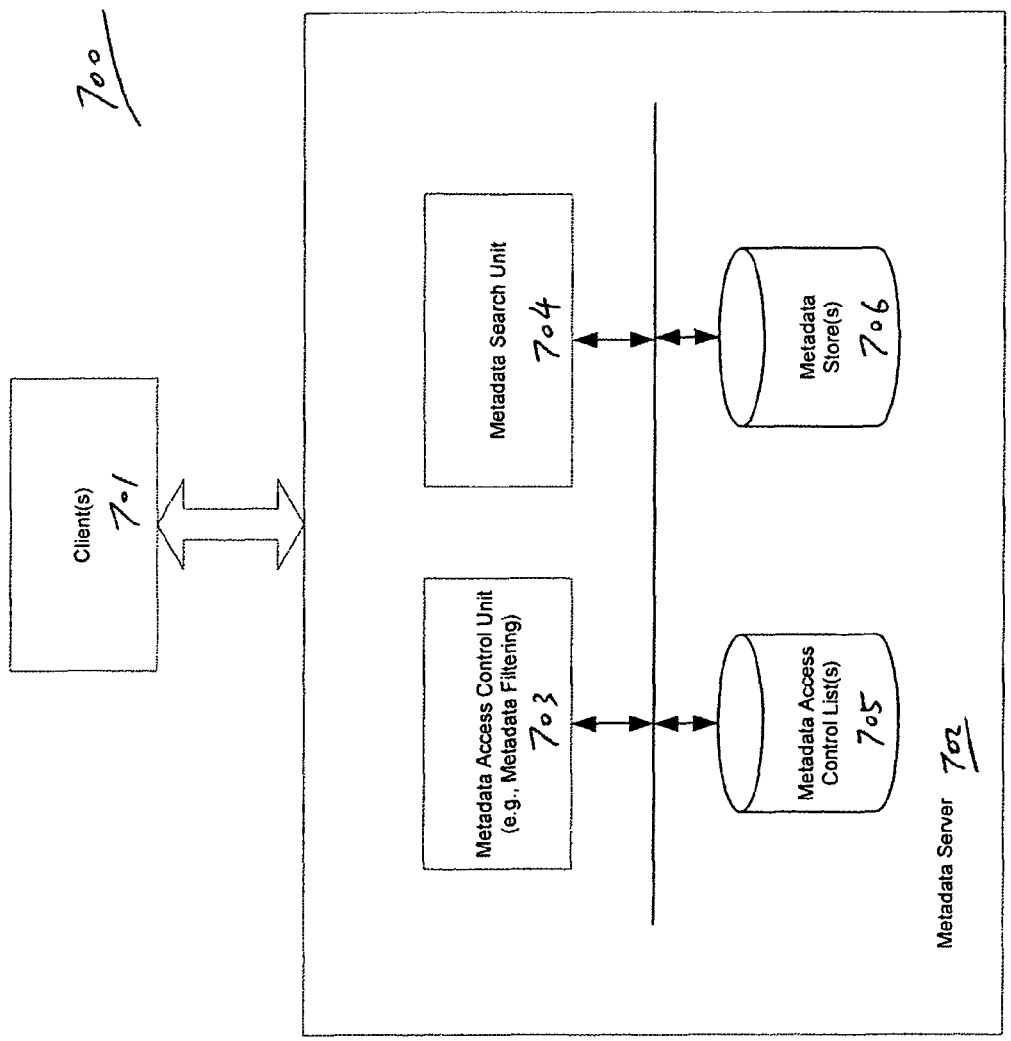
FIG. 7A is a block diagram illustrating a metadata processing system according to one embodiment of the invention.

FIG. 7A is a block diagram illustrating a metadata processing system according to one embodiment of the invention. For example, system 700 may be implemented as a part of system 100 of FIG. 1. Referring to FIG. 7A, system 700 includes one or more clients 701 communicatively coupled (e.g., locally or over a network) to a metadata server 702. Metadata server 702 includes a metadata search unit 704 to search metadata stored in one or more metadata stores 706, which may be a local store or a distant store (e.g., locally or remotely over a network). Server 702 further includes a metadata access control unit 703 to control accesses of clients 701 to the metadata stored in metadata stores 706 based on user privileges associated with the clients 701.

Figure 7B:
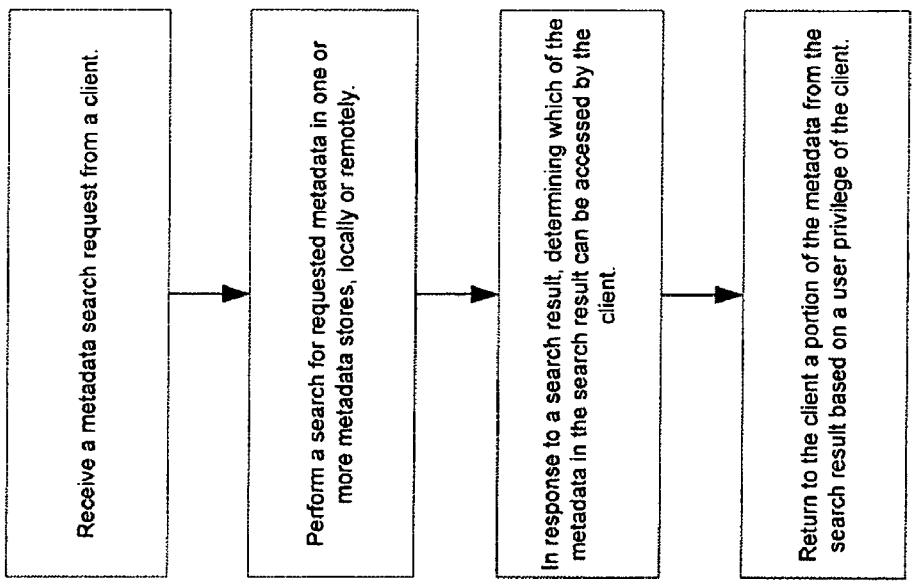
FIGS. 7B and 7C are flow diagrams illustrating processes for searching metadata according to certain embodiments of the invention.
Figure 7C:
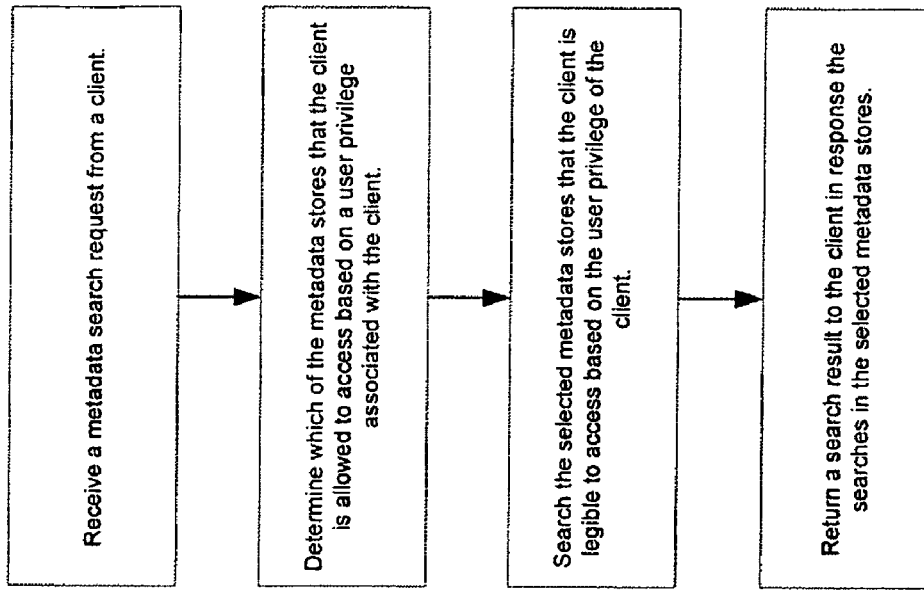

FIGS. 7B and 7C are flow diagrams illustrating processes for searching metadata according to certain embodiments of the invention. Processes as shown in FIGS. 7B and 7C may be performed by a processing logic which may include software, hardware, or both. For example, processes as shown in FIGS. 7B and 7C may be performed by system 700 of FIG. 7A. Referring to FIG. 7B, in this process example according to one embodiment, a search result of metadata is filtered based on user privileges of the requesting client or clients. Referring to FIG. 7C, in this process example according to an alternative embodiment, accesses of certain metadata stores are limited to certain users or clients based on the user privileges of the users or clients. Other configurations may exist.

Figures 8A, 9:
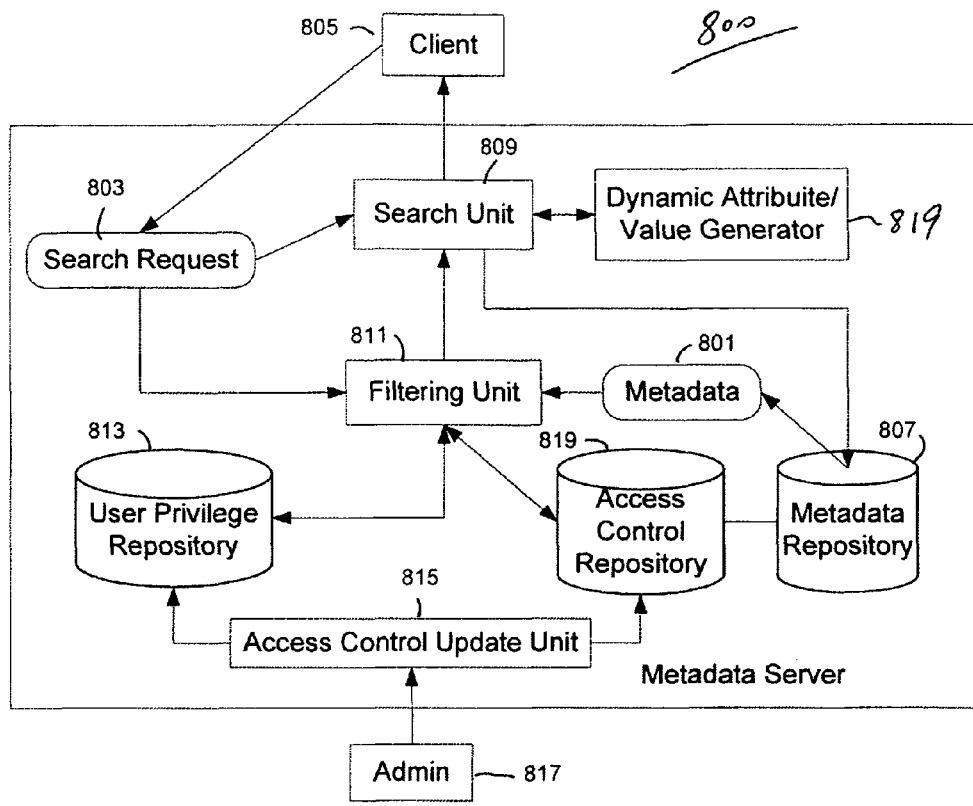
FIG. 8A is a block diagram illustrating a system for filtering metadata based on a user privilege according to one embodiment.
FIG. 9 is a diagram illustrating an example of metadata in view of user privileges according to one embodiment.

FIG. 8A is a block diagram illustrating a system for filtering metadata based on a user privilege according to one embodiment. For example, system 800 may be implemented as part of system 700 of FIG. 7A. In this example, according to one embodiment, metadata 801 is retrieved from a metadata repository 807 by a search unit 809 according to a search request 803 from a client 805. Before the metadata 801 is returned to the client 805, it is forwarded to a filtering unit 811 to determine whether any element or attribute in the metadata should be returned as part of the search result. In a particular embodiment, filtering unit 811 may obtain a user ID from the search request 803 and retrieve user privilege information for the user from a user privilege repository 813. The filtering unit 811 may obtain the corresponding access control information, such as access control list, for the metadata 801 from the access control repository 819. Based on the user privilege and the access information, the filtering unit 811 thereby selects some or all of the metadata and returns the filtered metadata to the search unit 809 for responding back to the client 805. In one embodiment, the filtering unit 811 may cache certain information about selected portion of metadata with respect to the user inside the user privilege repository 813 for performance purpose. In one embodiment, user privileges and metadata access control are updated through an access control update unit 815 from an administration process 817 operated by an administrator. In one embodiment, the access control update unit 815 calls a plug-in interface associated with a plug-in application to update access control information about a metadata stored inside the plug-in application. Furthermore, an additional set of values may be generated, for example, by attribute generator 819, on the fly to be paired with a new attribute for a user with a certain privilege. Other components may also be included.

Figure 8B:
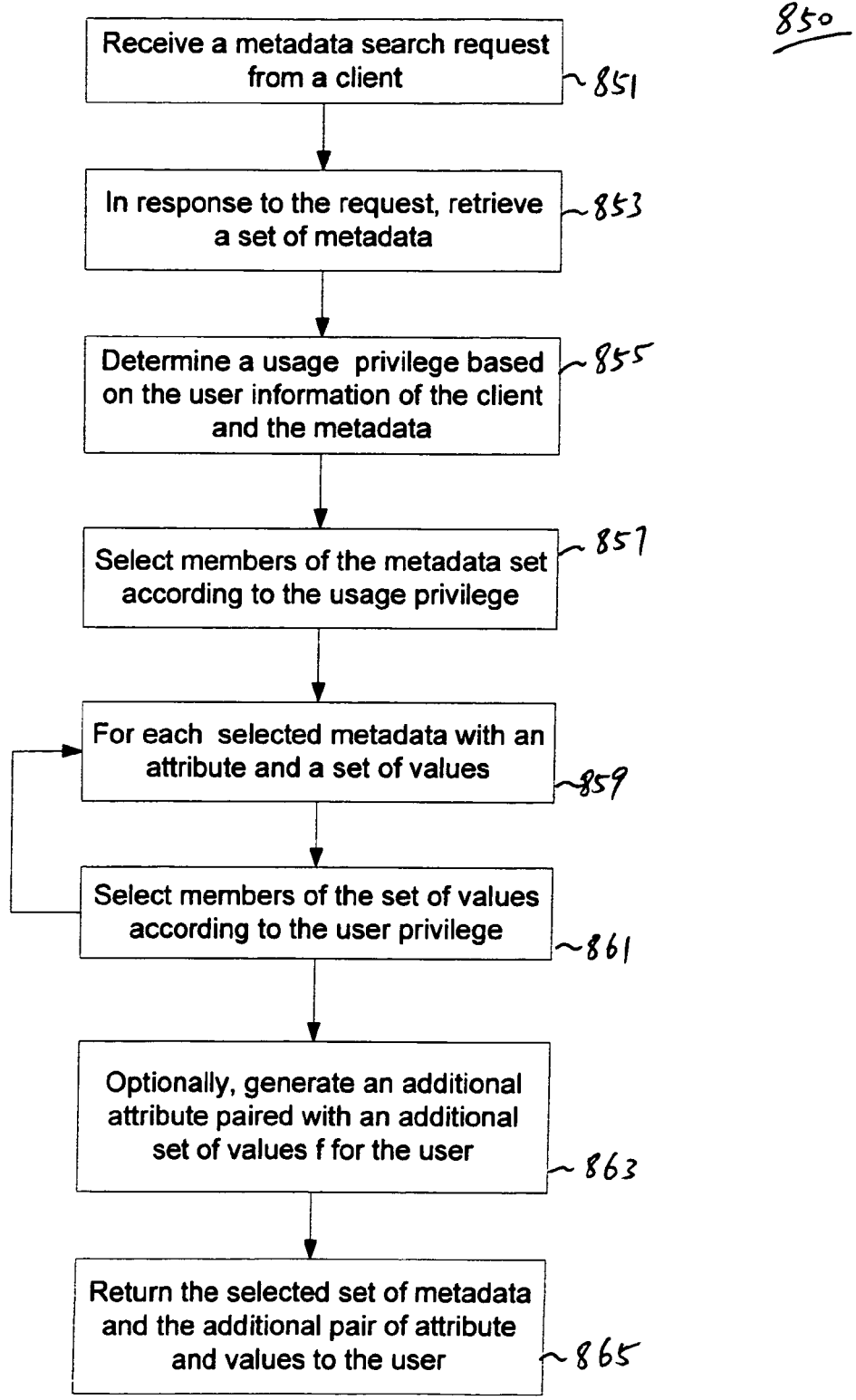
FIG. 8B is a flow diagram illustrating a process for filtering metadata according to one embodiment of the invention.

FIG. 8B is a flow diagram illustrating a process for filtering metadata according to one embodiment of the invention. Process 850 may be performed by a processing logic which may include software, hardware, or both. For example, process 850 may be performed by system 800 of FIG. 8A. Referring to FIG. 8B, a metadata search request is received from a client at block 851. In one embodiment, the search request may be sent from a client process operated by a user. In another embodiment, the search request may also be issued automatically by a client process owned by a user. A set of metadata is then retrieved based on the search request (block 853). The metadata may reside in a local disk volume or a remotely mounted disk volume. The metadata may be retrieved by a search over locally coupled metadata storages. Alternatively, the metadata may be returned from a third party application performing a metadata search over its own metadata storage according to the search request.

The user associated with the requesting client has to have a permission to access the returned metadata. A retrieved metadata or a portion of it may not be proper to return to the requesting client. At block 855, a usage privilege is determined based on the retrieved metadata and the user. Information about the user for determining the usage privilege may include the unique user ID and a user privilege such as which groups the user belongs to. In one embodiment, the user ID may be extracted from a metadata request. In another embodiment, a user may be the current user logged in to the search facility where the user privilege may be available from the system environment settings. Information about the retrieved metadata for determining the usage privilege may include an access control list associated with the metadata. In one embodiment, the access control list may be obtained from the local metadata storage. In another embodiment, the access control list may be available through a plug-in interface with a third party plug-in application. The access control list may include access right such as "read", "write", or "list" to the whole set or a portion of the elements of the metadata. The access control list may also prescribe applicability of an access right to, such as, for example, a certain user, a certain group of users, or every user. The usage privilege is thereby determined according to the user privilege and the access control information of the metadata.

At block 857, a metadata is selected if it is determined some elements of the metadata can be accessed by the user. For each selected metadata, the elements inside the selected metadata are further filtered at block 859. In one embodiment, a metadata includes an attribute and an associated set of values. Each of the associated set of values may have its own access control list. In one embodiment, one access control list controls the whole set of values. Similar to selecting a metadata at block 857 using a usage privilege, the usage privilege of each value according to the user privilege of the user and the access control information of the value is applied to determine if the value should be selected at block 859. Following block 861, the whole set, a subset, or none of the associated value of the metadata may be selected.

Optionally, at block 863, an additional set of values may be generated on the fly to be paired with a new attribute for a user with a certain privilege. In one embodiment, the attribute may be "total search time" and the set of values contains one element for the time spent to complete this metadata search. In one embodiment, a user with a privilege belonging to a "root" group will trigger generating such a dynamic pair of attribute and values. Finally, at block 865, all the selected metadata elements and the optionally generated pairs of attributes and values are returned to the requesting client. Therefore, for the same metadata search request, one user might receive a smaller number of metadata than those received from a second user. It is also possible that certain users may receive a list of attributes without any values from a metadata search request. Other operations may also be performed.

FIG. 9 is a diagram illustrating an example of metadata in view of user privileges according to one embodiment. For example, such resource processes may be used by system 800 of FIG. 8A. Referring to FIG. 9, a resource 901 is represented by a table including three entries, a data pointer points to the data content 903, a first attribute having three values 905, and a second attribute having only one value 907. Attr1 with its value set (Val1, Val2, Val3) and Attr2 with its value set (Val4) are two metadata associated with the resource 901. A metadata search request issued by User1 returns a portion of the values for the first metadata and only the attribute for the second metadata 909. User1 has permission only to access attribute names of the metadata and partial values of the first metadata. For User2 with different user privilege than User1, the same search request returns, however, only the first metadata with a complete set of values 911. User2 does not have permission to view the existence of the second metadata of resource R. User3, on the other hand, has full permission to access metadata of resource R and receives additionally an extra pair of attribute Attr3 with two values, Val5 and Val6, 913 created on the fly to be part of the search result for User3. Note that FIG. 9 is described for the purposes of illustration only. Other formats or settings of the metadata may be applied.

Figures 10A, 10B:
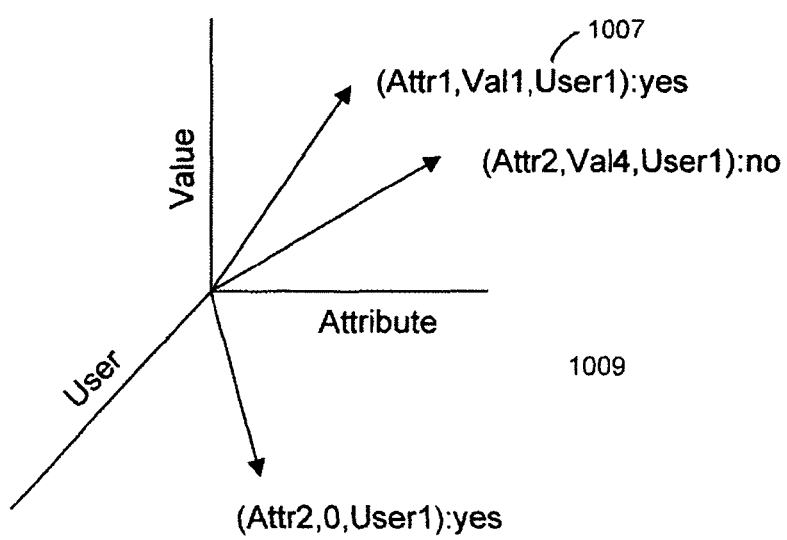
FIGS. 10A and 10B are diagrams illustrating usage privileges for filtering the metadata according to certain embodiments of the invention.

FIGS. 10A and 10B are diagrams illustrating usage privileges for filtering the metadata according to certain embodiments of the invention. Referring to FIGS. 10A and 10B, table 1001 shows which user has a permission to access which attributes. A marked box indicates an access privilege. For example, all three users have accesses to metadata attribute Attr1, but User2 is not allowed to access metadata attribute Attr2. Table 1003 illustrates usage privileges for a set of values associated with Attr1. Similarly, table 1005 illustrates usage privileges for a set of values associated with Attr2. Note that the usage privilege in table 1001 and the usage privilege in table 1005 are not completely independent. Usually, if a user does not have right to access a metadata attribute, a user would not have access to any of the associated values of the same attribute. Conceptually, for any given triplet of (attribute, value, user), the usage privilege could also be shown in a three-dimensional space with a yes or no value 1009. For the same example, (Attr1, Val1, User1) has a "yes" value because User1 has access right to both attribute Attr1 and one of its values Val1 1007. Again note that FIGS. 10A and 10B are shown for the purposes of illustration only. Other formats or settings of the metadata may be applied.

An Example of a Data Processing System

Figure 11:
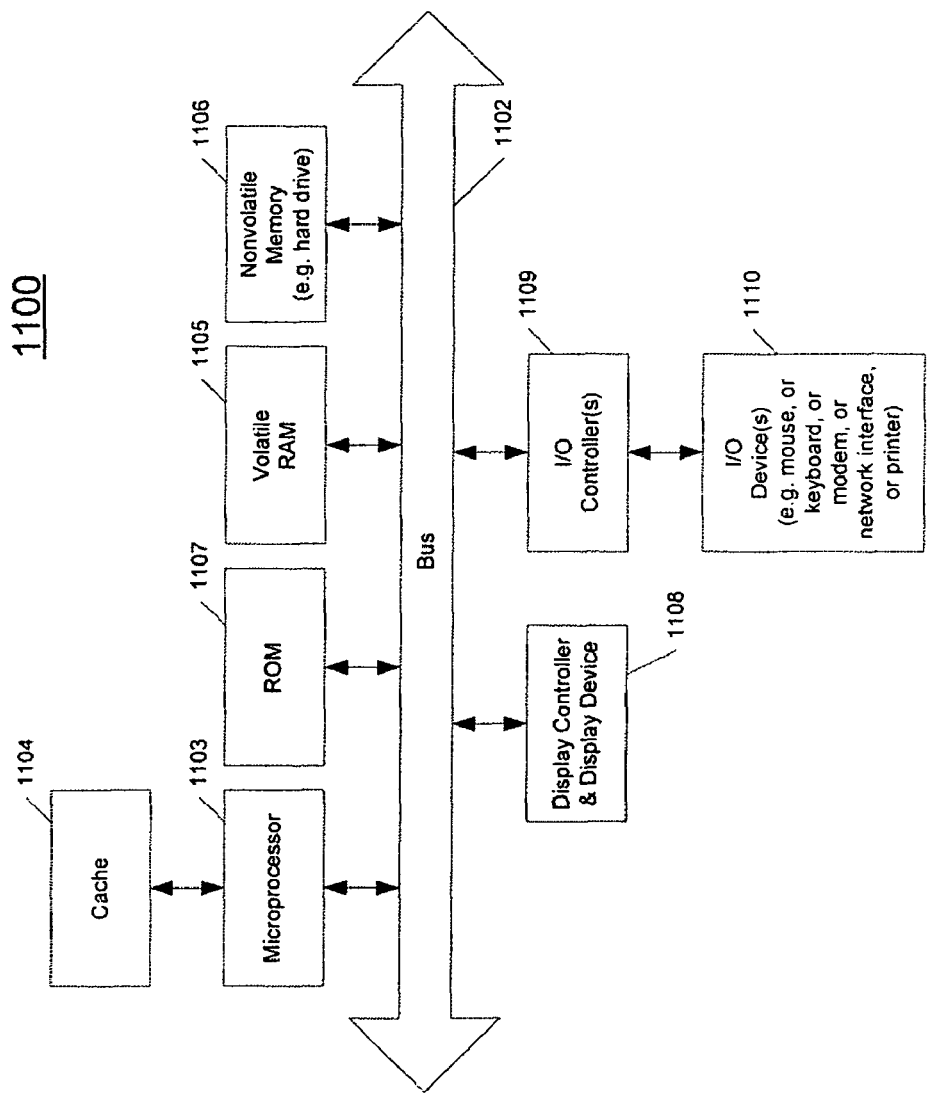
FIG. 11 is a block diagram of a digital processing system, which may be used with one embodiment of the invention.

FIG. 11 is a block diagram of a digital processing system, which may be used with one embodiment of the invention.

For example, the system 1100 shown in FIG. 11 may be used as a machine or a system described above and may be used to perform any of the operations set forth above through this application, as a client, a server, or both.

Note that while FIG. 11 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention. The computer system of FIG. 11 may, for example, be an Apple Macintosh computer or an IBM compatible PC.

As shown in FIG. 11, the computer system 1100, which is a form of a data processing system, includes a bus 1102 which is coupled to a microprocessor 1103 and a ROM 1107, a volatile RAM 1105, and a non-volatile memory 1106. The microprocessor 1103, which may be, for example, a PowerPC G4 or PowerPC G5 microprocessor from Motorola, Inc. or IBM, is coupled to cache memory 1104 as shown in the example of FIG. 11. Microprocessor 1103 may include multiple processors or multiple core logics (e.g., logical processors). The bus 1102 interconnects these various components together and also interconnects these components 1103, 1107, 1105, and 1106 to a display controller and display device 1108, as well as to input/output (I/O) devices 1110, which may be mice, keyboards, modems, network interfaces, printers, and other devices which are well-known in the art.

Typically, the input/output devices 1110 are coupled to the system through input/output controllers 1109. The volatile RAM 1105 is typically implemented as dynamic RAM (DRAM) which requires power continuously in order to refresh or maintain the data in the memory. The non-volatile memory 1106 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 11 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 1102 may include one or more buses connected to each other through various bridges, controllers, and/or adapters, as is well-known in the art. In one embodiment, the I/O controller 1109 includes a USB (Universal Serial Bus) adapter for controlling USB peripherals. Alternatively, I/O controller 1109 may include an IEEE-1394 adapter, also known as FireWire adapter, for controlling FireWire devices.

Thus, methods and apparatus for processing metadata have been described. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine, having one or more processors, implemented method, comprising:

in response to a search request received from a client for searching metadata stored within one or more metadata stores in a storage associated with a search facility, identifying a search scope based on the search request, wherein the search scope defines whether a search should be performed locally, remotely, or both;

matching a service scope of each of a plurality of metadata stores with the search scope of the search request, the plurality of metadata stores having registered with the search facility, wherein each metadata store is associated with a service scope specifying whether the metadata store is located locally or remotely;

generating a set of one or more search targets from the plurality of metadata stores that have the associated service scope matched with the search scope of the search request;

for each of the search targets, retrieving a plug-in interface and a plug-in application associated with the search target;

invoking the plug-in application via the associated plug-in interface to perform the requested search in the corresponding metadata store, wherein each of the metadata stores only stores metadata extracted from one or more data files which are stored in a separate storage location of the storage; and returning at least a portion of a search result to the client based on an access privilege of the client, wherein the search result is used to determine whether the corresponding one or more data files contain information related to a search term of the search request without having to search the one or more data files to improve an efficiency of the search.

2. The method of claim 1, further comprising, for each search target, returning a search result from the associated plug-in application, the search result including an application identifier that identifies the associated plug-in application and a resource identifier that identifies a location of one or more data files that contain the information related to the search term of the search request.

3. The method of claim 2, wherein the search request including a user identifier identifying a user issuing the search request and wherein the returning further comprises:

retrieving a set of search results from the plug-in applications associated with the search targets;

selecting a subset of search results from the set of search results that satisfy a user privilege associated with the user identifier; and returning only the selected subset of search results to the user identified by the user identifier.

4. The method of claim 2, wherein at least one plug-in application has a universal resource locator and wherein the application identifier is based on the universal resource locator.

5. The method of claim 2, wherein at least one plug-in application runs in a remote network server.

6. The method of claim 1, further comprising registering each of the plug-in applications associated with the plurality of metadata stores, including storing in a database a plug-in interface identifier (ID) identifying an executable through which the associated plug-in application can be invoked and a service scope of the plug-in application defining the search capability of the plug-in application.

7. The method of claim 6, wherein each plug-in application is specifically tailored to search in metadata in its associated metadata store in a manner that is different than other metadata stores, such that the search facility does not have to know a specific format of the metadata stored therein.

8. A non-transitory machine-readable storage medium having instructions, when executed by a processor, cause the machine to perform a method, the method comprising:

in response to a search request received from a client for searching metadata stored within one or more metadata stores in a storage associated with a search facility, identifying a search scope based on the search request, wherein the search scope defines whether a search should be performed locally, remotely, or both;

matching a service scope of each of a plurality of metadata stores with the search scope of the search request, the plurality of metadata stores having registered with the search facility, wherein each metadata store is associated with a service scope specifying whether the metadata store is located locally or remotely;

generating a set of one or more search targets from the plurality of metadata stores that have the associated service scope matched with the search scope of the search request;

for each of the search targets, retrieving a plug-in interface and a plug-in application associated with the search target;

invoking the plug-in application via the associated plug-in interface to perform the requested search in the corresponding metadata store, wherein each of the metadata stores only stores metadata extracted from one or more data files which are stored in a separate storage location of the storage; and returning at least a portion of a search result to the client based on an access privilege of the client, wherein the search result is used to determine whether the corresponding one or more data files contain information related to a search term of the search request without having to search the one or more data files to improve an efficiency of the search.

9. The non-transitory machine-readable storage medium of claim 8, further comprising, for each search target, returning a search result from the associated plug-in application, the search result including an application identifier that identifies the associated plug-in application and a resource identifier that identifies a location of one or more data files that contain the information related to the search term of the search request.

10. The non-transitory machine-readable storage medium of claim 9, wherein the search request including a user identifier identifying a user issuing the search request and wherein the returning further comprises:

retrieving a set of search results from the plug-in application associated with the search request;

selecting a subset of search results from the set of search results that satisfy a user privilege associated with the user identifier; and returning only the selected subset of search results to the user identified by the user identifier.

11. The non-transitory machine-readable storage medium of claim 9, wherein at least one plug-in application has a universal resource locator and the application identifier is based on the universal resource locator.

12. The non-transitory machine-readable storage medium of claim 9, wherein at least one plug-in application runs in a remote network server.

13. The machine-readable storage medium of claim 8, wherein the method further comprises registering each of the plug-in applications associated with the plurality of metadata stores, including storing in a database a plug-in interface identifier (ID) identifying an executable through which the associated plug-in application can be invoked and a service scope of the plug-in application defining the search capability of the plug-in application.

14. The non-transitory machine-readable storage medium of claim 13, wherein each plug-in application is specifically tailored to search in metadata in its associated metadata store in a manner that is different than other metadata stores, such that the search facility does not have to know a specific format of the metadata stored therein.

15. An apparatus, having one or more processors, comprising:

a search unit to, in response to a search request received from a client for searching metadata stored within one or more metadata stores in a storage associated with a search facility, to identify a search scope based on the search request, wherein the search scope defines whether a search should be performed locally, remotely, or both, to match a service scope of each of a plurality of metadata stores with the search scope of the search request, the plurality metadata stores having registered with the search facility, wherein each metadata store is associated with a service scope specifying whether the metadata store is locally or remotely, to generate a set of one or more search targets from the plurality of metadata stores that have the associated service scope matched with the search scope of the search request, and a plug-in application associated with each of the search targets to perform the requested search within the corresponding metadata store, wherein the search unit retrieves a plug-in interface associated with the plug-in application and invokes via the plug-in interface the plug-in application, wherein each metadata store only stores metadata extracted from one or more data files which are stored in a separate storage location of the storage, wherein the search unit returns at least a portion of a search result to the client based on an access privilege of the client, and wherein the search result is used to determine whether the corresponding one or more data files contain a search term of the search request without having to search the one or more data files to improve an efficiency of the search.

16. An apparatus, having one or more processors, comprising:

in response to a search request received from a client for searching metadata stored within one or more metadata stores in a storage associated with a search facility, means for identifying a search scope based on the search request, wherein the search scope defines whether a search should be performed locally or remotely;

means for matching a service scope of each of a plurality of metadata stores with the search scope of the search request, the plurality of metadata stores having registered with the search facility, wherein each metadata store is associated with a service scope specifying whether the metadata store is located locally or remotely;

means for generating a set of one or more search targets from the plurality of metadata stores that have the associated service scope matched with the search scope of the search request;

for each of the search targets, means for retrieving a plug-in interface and a plug-in application associated with the search target;

means for invoking the plug-in application via the associated plug-in interface to perform the requested search in the corresponding metadata store, wherein each of the metadata stores only stores metadata extracted from one or more data files which are stored in a separate storage location of the storage; and means for returning at least a portion of a search result to the client based on an access privilege of the client, wherein the search result is used to determine whether the corresponding one or more data files contain information related to a search term of the search request without having to search the one or more data files to improve an efficiency of the search.

17. A machine implemented method, having one or more processors, comprising:

in response to a search request from a client for searching metadata within a metadata store, performing a search in one or more metadata stores through one or more plug-in applications associated with the one or more metadata stores by matching a search scope of the search request with a service scope of each of the one or more plug-in applications, the search scope specifying whether the search should be performed locally, remotely, or both and the service scope indicating whether the corresponding plug-in application is able to search locally, remote, or both, resulting in set of metadata, the client being a desktop application running at a desktop of a local computer, wherein the metadata store only stores metadata extracted from one or more data files which are stored in a separate storage location of the local computer, wherein the search result of the metadata is used to determine whether the corresponding one or more data files contain information related to a search term of the search request without having to search the one or more data files to improve an efficiency of the search;

determining a usage privilege based on attributes of the metadata and a privilege of a user who logs onto the desktop of the local computer, wherein the privilege of the user is obtained from an access control list (ACL) maintained within a file system of the local computer; and returning at least a portion of the set of metadata to the client based on the usage privilege associated with the client.

18. The method of claim 17, wherein the metadata includes an attribute and a set of values.

19. The method of claim 18, wherein the returning further comprises:

selecting a member of the set of values for the attribute, wherein the portion of the set of metadata includes the attribute and the member of the set of values.

20. The method of claim 18, further comprising:

generating an additional attribute with an additional set of values from a resource in the search facility, wherein the first metadata is associated with the resource.

21. A non-transitory machine-readable storage medium having instructions, when executed by a machine, cause the machine to perform a method, the method comprising:

in response to a search request from a client for searching metadata within a metadata store, performing a search in one or more metadata stores through one or more plug-in applications associated with the one or more metadata stores by matching a search scope of the search request with a service scope of each of the one or more plug-in applications, the search scope specifying whether the search should be performed locally, remotely, or both and the service scope indicating whether the corresponding plug-in application is able to search locally, remote, or both, resulting in set of metadata, the client being a desktop application running at a desktop of a local computer, wherein the metadata store only stores metadata extracted from one or more data files which are stored in a separate storage location of the local computer, wherein the search result of the metadata is used to determine whether the corresponding one or more data files contain information related to a search term of the search request without having to search the one or more data files to improve an efficiency of the search;

determining a usage privilege based on attributes of the metadata and a privilege of a user who logs onto the desktop of the local computer, wherein the privilege of the user is obtained from an access control list (ACL) maintained within a file system of the local computer; and returning at least a portion of the set of metadata to the client based on a usage privilege associated with the client.

22. The non-transitory machine-readable storage medium of claim 21, wherein the filtering operations comprises:

retrieving the set of metadata;

determining a usage privilege based on the user and the set of metadata; and selecting a first metadata of the set of metadata according to the usage privilege, wherein the portion of the set of metadata includes the first metadata.

23. The non-transitory machine-readable storage medium of claim 22, wherein the metadata includes an attribute and a set of values.

24. The non-transitory machine-readable storage medium of claim 23, wherein the returning further comprises:

selecting a member of the set of values for the attribute, wherein the portion of the set of metadata includes the attribute and the member of the set of values.

25. The non-transitory machine-readable storage medium of claim 23, further comprising:

generating an additional attribute with an additional set of values from a resource in the search facility, wherein the first metadata is associated with the resource.

26. An apparatus, having one or more processors, comprising:

a search unit, in response to a search request from a client for searching metadata within a metadata store, to perform a search in one or more metadata stores through one or more plug-in applications associated with the one or more metadata stores by matching a search scope of the search request with a service scope of each of the one or more plug-in applications, the search scope specifying whether the search should be performed locally, remotely, or both and the service scope indicating whether the corresponding plug-in application is able to search locally, remote, or both, resulting in set of metadata, the client being a desktop application running at a desktop of a local computer, wherein the metadata store only stores metadata extracted from one or more data files which are stored in a separate storage location of the local computer, wherein the search result of the metadata is used to determine whether the corresponding one or more data files contain information related to a search term of the search request without having to search the one or more data files to improve an efficiency of the search;

an access control unit to determine a usage privilege based on attributes of the metadata and a privilege of a user who logs onto the desktop of the local computer, wherein the privilege of the user is obtained from an access control list (ACL) maintained within a file system of the local computer; and a filtering unit to return at least a portion of the set of metadata to the client based on a usage privilege associated with the client.

27. An apparatus, having one or more processors, comprising:

in response to a search request from a client for searching metadata within a metadata store, means for performing a search in one or more metadata stores through one or more plug-in applications associated with the one or more metadata stores by matching a search scope of the search request with a service scope of each of the one or more plug-in applications, the search scope specifying whether the search should be performed locally, remotely, or both and the service scope indicating whether the corresponding plug-in application is able to search locally, remote, or both, resulting in a set of metadata, the client being a desktop application running at a desktop of a local computer, wherein the metadata store only stores metadata extracted from one or more data files which are stored in a separate storage location of the local computer, wherein the search result of the metadata is used to determine whether the corresponding one or more data files contain information related to a search term of the search request without having to search the one or more data files to improve an efficiency of the search;

means for determining a usage privilege based on attributes of the metadata and a privilege of a user who logs onto the desktop of the local computer, wherein the privilege of the user is obtained from an access control list (ACL) maintained within a file system of the local computer; and means for returning at least a portion of the set of metadata to the client based on a usage privilege associated with the client.

* * * * *